J. PLANCK.
Mill-Stone Drivers.

No. 136,863.  Patented March 18, 1873.

ATTEST  
N. S. Sprague  
H. F. Eberts

INVENTOR  
John Planck  
By Atty  
Thos. S. Sprague

UNITED STATES PATENT OFFICE.

JOHN PLANCK, OF CONSTANTINE, MICHIGAN, ASSIGNOR TO HIMSELF AND WILLIAM PATTERSON, OF SAME PLACE.

IMPROVEMENT IN MILLSTONE-DRIVERS.

Specification forming part of Letters Patent No. 136,863, dated March 18, 1873.

*To all whom it may concern:*

Be it known that I, JOHN PLANCK, of Constantine, in the county of St. Joseph and State of Michigan, have invented a new and useful Improvement in Millstone-Drivers; and I do declare that the following is a true and accurate description thereof, reference being had to the accompanying drawing and to the letters of reference marked thereon, and being a part of this specification, in which—

Figure 1:
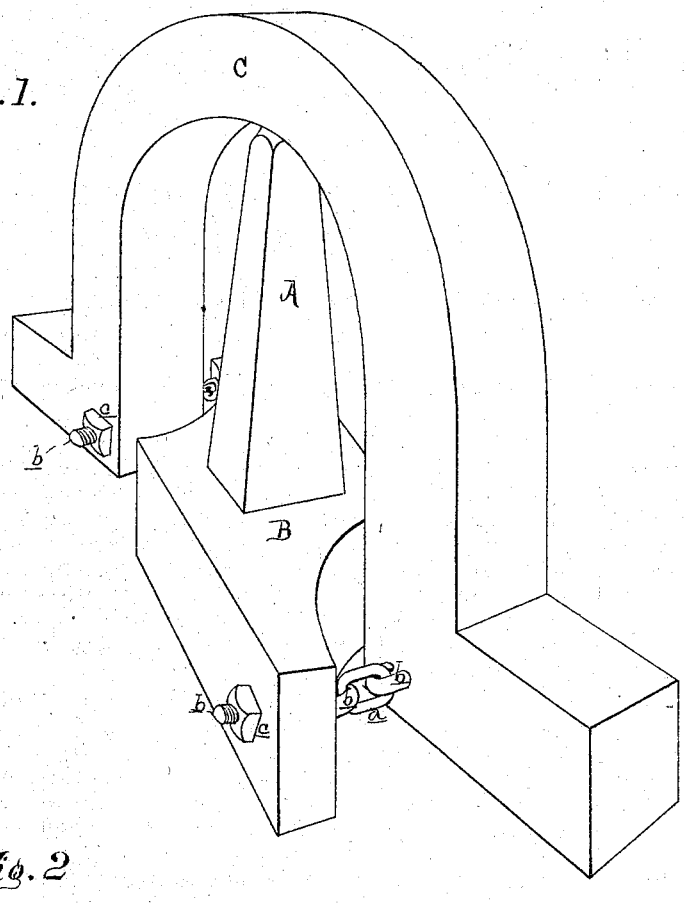
Figure 2:
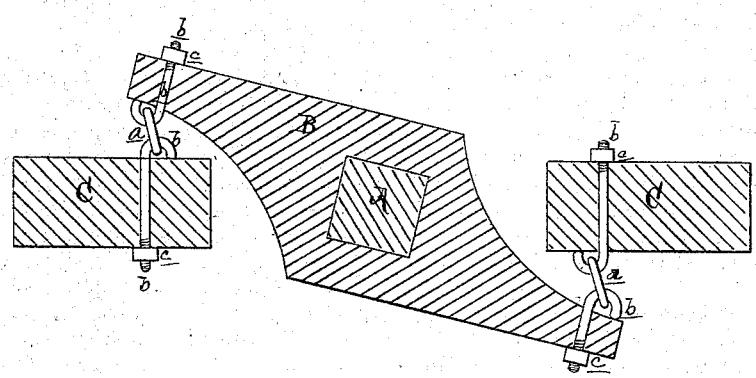

Figure 1 is a perspective view, showing my improved method of connecting the driver to the bale of the runner-stone and drawing the runner around instead of pushing it; and Fig. 2 is a horizontal section of the same on the plane $x\ x$ in Fig. 1.

Like letters refer to like parts in each figure.

This invention relates to an improved method of propelling the runner-stone in grinding-mills; and has for its object to leave the runner perfectly free to accommodate itself to the bed-stone by relieving it from the binding and friction of the ends of the driver upon the heels of the bale while running. The invention consists in attaching the ends of the links to the driver by adjustable eye-bolts, by which the two ends of the driver may pull equally upon the bale, and thus prevent the "cocking" of the stone.

In the drawing, A represents the cock-head of the spindle passing through the eye of the driver B, which revolves with it. C is the bale of the runner-stone poised and stepped on the cock-head. Instead of having the ends of the driver push upon the heel of the bale I connect each end of the driver to the heel of the bale by a link, $a$, with which engage two eye-bolts, $b\ b$, one of which passes through the bale and the other through the driver, with their outer ends threaded to receive a screw-nut, $c$. These nuts are adjusted on their respective bolts until the draft of the driver is equally divided between the two connections. The spindle and connections revolve in the direction of the arrow.

By this plan I leave the runner-stone in its natural running balance, and perfectly free to accommodate itself to the bed-stone. Heretofore, with a "driving Ryne," the pressure of the driver upon the bale created such a friction when the bale moved with the runner that the movement was, in a great measure, prevented or retarded so that the runner could not fully and freely adjust itself to face with the bed-stone.

It is well known that it is next to impossible to keep the spindle in perfect tram, and, therefore, the runner should be free to adjust itself according to the requirements of the moment; hence the utility of this connection and method of propelling the stone.

What I claim as my invention, and desire to secure by Letters Patent, is—

The employment of an adjustable link or links at each end of a millstone-driver, for connecting the same to the bale of the runner-stone, substantially as shown and set forth.

JOHN PLANCK.

Witnesses:
   SOLOMON CHRONISTER,
   HIRAM LINDSLY.